(12) United States Patent
Crabtree et al.

(10) Patent No.: US 10,680,890 B2
(45) Date of Patent: *Jun. 9, 2020

(54) NON-DISRUPTIVELY SPLITTING A COORDINATED TIMING NETWORK

(71) Applicant: INTERNATIONAL BUSINESS MACHINES CORPORATION, Armonk, NY (US)

(72) Inventors: Donald Crabtree, Port Ewen, NY (US); John S. Houston, Hopewell Junction, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/212,880

(22) Filed: Dec. 7, 2018

(65) Prior Publication Data

US 2019/0109763 A1  Apr. 11, 2019

Related U.S. Application Data

(63) Continuation of application No. 14/920,928, filed on Oct. 23, 2015, now Pat. No. 10,177,979.

(51) Int. Cl.
| | |
|---|---|
| *G06F 15/177* | (2006.01) |
| *G06F 15/173* | (2006.01) |
| *H04L 12/24* | (2006.01) |
| *G06F 1/14* | (2006.01) |
| *H04J 3/06* | (2006.01) |

(52) U.S. Cl.
CPC ........... *H04L 41/0816* (2013.01); *G06F 1/14* (2013.01); *H04J 3/0641* (2013.01); *H04J 3/0679* (2013.01)

(58) Field of Classification Search
CPC .............................. H04L 41/0816; G06F 1/14
USPC ................................................ 709/221, 223
See application file for complete search history.

(56) References Cited

U.S. PATENT DOCUMENTS

| | | | |
|---|---|---|---|
| 6,437,804 B1 * | 8/2002 | Ibe ....................... G06F 17/509 |
| | | | 709/223 |
| 6,725,218 B1 * | 4/2004 | Podanoffsky ....... G06F 16/2272 |
| 7,343,170 B1 | 3/2008 | Feeney et al. | |

(Continued)

FOREIGN PATENT DOCUMENTS

| | | |
|---|---|---|
| JP | 2011019098 | 1/2011 |
| WO | WO019550 A2 | 12/2001 |
| WO | WO2012070341 A1 | 5/2012 |

OTHER PUBLICATIONS

Anonymous, "Method and System of Providing Fail-over Service for Asynchronous Requests in Cluster Environment," IP.com No. 000227706, May 13, 2013, pp. 1-10.

(Continued)

*Primary Examiner* — Madhu Woolcock
(74) *Attorney, Agent, or Firm* — Steven Chiu, Esq.; Blanche E. Schiller, Esq.; Heslin Rothenberg Farley & Mesiti P.C.

(57) ABSTRACT

A coordinated timing network is dynamically split into a plurality of coordinated timing networks. This split occurs without taking down any of the servers. Each coordinated timing network has its own coordinated timing network identifier (CTN ID), and its own primary time server. Optionally, each coordinated timing network includes a backup time server and an arbiter.

20 Claims, 9 Drawing Sheets

(56) References Cited

U.S. PATENT DOCUMENTS

| | | | |
|---|---|---|---|
| 7,774,440 B1* | 8/2010 | Bagrodia | H04L 41/0816 703/1 |
| 7,783,736 B2 | 8/2010 | Carlson et al. | |
| 7,818,370 B2* | 10/2010 | Piper | G06F 9/5061 709/203 |
| 7,925,916 B2 | 4/2011 | Carlson et al. | |
| 8,001,225 B2 | 8/2011 | Carlson et al. | |
| 8,416,811 B2 | 4/2013 | Carlson et al. | |
| 8,583,769 B1* | 11/2013 | Peters | G06F 9/541 709/221 |
| 8,589,520 B2 | 11/2013 | Stimac | |
| 10,177,979 B2 | 1/2019 | Crabtree et al. | |
| 10,447,532 B2 | 10/2019 | Crabtree et al. | |
| 2005/0193113 A1* | 9/2005 | Kokusho | G06F 9/5083 709/225 |
| 2005/0289388 A1* | 12/2005 | Black-Ziegelbein | G06F 9/5061 714/6.32 |
| 2008/0063165 A1* | 3/2008 | Gallant | H04Q 3/0029 379/133 |
| 2008/0168182 A1* | 7/2008 | Frank | G06F 1/12 709/248 |
| 2008/0183897 A1* | 7/2008 | Carlson | G06F 1/14 709/248 |
| 2009/0109870 A1 | 4/2009 | Metke et al. | |
| 2009/0171732 A1* | 7/2009 | Bobak | G06Q 10/0633 705/7.13 |
| 2009/0224906 A1 | 9/2009 | Balgard | |
| 2010/0091760 A1 | 4/2010 | Yoon | |
| 2010/0103781 A1 | 4/2010 | Rai et al. | |
| 2011/0149803 A1 | 6/2011 | McCormack | |
| 2011/0213825 A1* | 9/2011 | Chrabaszcz | G06F 9/5061 709/203 |
| 2011/0246675 A1 | 10/2011 | Fukami | |
| 2012/0226824 A1* | 9/2012 | Trnkus | H04W 16/18 709/250 |
| 2013/0219036 A1* | 8/2013 | Gusev | G06F 9/5061 709/223 |
| 2013/0308624 A1 | 11/2013 | Phillips | |
| 2014/0230015 A1 | 8/2014 | Pollock | |
| 2014/0293828 A1 | 10/2014 | Lee et al. | |
| 2014/0365685 A1 | 12/2014 | Bangma et al. | |
| 2016/0119219 A1* | 4/2016 | Fang | H04L 45/02 370/392 |
| 2016/0316420 A1 | 10/2016 | Mustafa | |
| 2017/0118006 A1 | 4/2017 | Crabtree | |

OTHER PUBLICATIONS

Brooks, Mark A., "z/OS Parallel Sysplex Update," Aug. 11, 2011, pp. 1-85.

Burbank, J. et al., "Network Time Protocol Version 4 Protocol and Algorithms Specification," Oct. 8, 2009, pp. 1-222.

IBM, "Server Time Synchronization," IP.com No. 000174424, Sep. 8, 2008, pp. 1-4.

IBM, "z/Architecture—Principles of Operation," SA22-7832-10, Eleventh Edition, Mar. 2015, pp. 1-1732.

Kozakos, George, "Reconfiguring Stp-only Coordinated Timing Networks," Dec. 20, 2013, pp. 1-10.

Mell, Peter and Tim Grance, "The NIST Definition of Cloud Computing," National Institute of Standards and Technology, Information Technology Laboratory, Special Publication 800-145, Sep. 2011, pp. 1-7.

Mills, David L., "Network Time Protocol Version 4 Reference and Information Guide," Jun. 2006, pp. 1-90.

List of IBM Patents or Patent Applications Treated as Related, Mar. 15, 2019, 2 pages.

Crabtree, Donald et al., "Non-Disruptively Merging Coordinated Timing Network," U.S. Appl. No. 16/533,111, filed Aug. 6, 2019, pp. 1-41.

List of IBM Patents or Patent Applications Treated as Related, Nov. 1, 2019, 2 pages.

* cited by examiner ic the present invention.

NON-DISRUPTIVELY SPLITTING A COORDINATED TIMING NETWORK

This application is a continuation of co-pending U.S. patent application Ser. No. 14/920,928, filed Oct. 23, 2015, entitled "NON-DISRUPTIVELY SPLITTING A COORDINATED TIMING NETWORK," which is hereby incorporated herein by reference in its entirety.

BACKGROUND

One or more aspects relate, in general, to coordinated timing networks, and in particular, to splitting coordinated timing networks.

A Coordinated Timing Network (CTN) is a network in which multiple distinct computing systems maintain time synchronization to form the coordinated timing network. Systems in the coordinated timing network employ a message based protocol, referred to as a Server Time Protocol (STP), to pass timekeeping information between the systems over existing, high-speed data links. This enables the time of day (TOD) clocks at each system to be synchronized to the accuracy required in today's high-end computing systems. Since the protocol makes use of technology within a computing system, synchronization accuracy scales as technology improves. A computing system that provides time to other computing systems is referred to as a time server or server herein.

Within a coordinated timing network for STP, there is to be only one server acting as the source of time for the network (referred to as the primary time server). If there is more than one time source, the two sources could diverge leading to a data integrity exposure. Likewise, if there is no single server acting as the source of time for the network, the clocks on the multiple servers could drift apart, raising a data integrity exposure in that way.

Customers using the Server Time Protocol have encountered situations in which the coordinated timing network is to be split into multiple separate CTNs. However, to accomplish this, one or more of the servers needs to be brought down. This is very disruptive to the customers' business and usually means a loss of business and revenue.

SUMMARY

Shortcomings of the prior art are overcome and additional advantages are provided through the provision of a computer program product for managing coordinated timing networks. The computer program product comprises a storage medium readable by a processing circuit and storing instructions for performing a method. The method includes determining that a coordinated timing network (CTN) is to be split into a plurality of coordinated timing networks. The coordinated timing network includes a plurality of servers. Based on determining that the coordinated timing network is to be split, splitting the coordinated timing network into the plurality of coordinated timing networks, wherein the splitting is performed non-disruptively in that servers of the coordinated timing network continue processing during the splitting.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

In accordance with one or more aspects, a Coordinated Timing Network (CTN) is split into a plurality of coordinated timing networks. This may be driven by a number of situations, including, but not limited to, changes internal to a business, or a business spinning off and transferring a portion of its business to a separate corporation, etc. Previously, customers have split a CTN by reassigning the role of the server serving as the source of time, shutting down all of the servers which will remain a part of the old CTN (or instead, the new CTN), and redefining the identifier of the CTN (CTN ID) for the remaining servers to a new CTN ID. The servers which had been shut down can then be brought up using the old CTN ID, which is separate and independent from the new CTN. This process of bringing down the servers to split a CTN into multiple CTNs is costly and inefficient.

Thus, in accordance with an aspect of the present invention, a coordinated timing network splitting capability is provided that enables a CTN split to be carried out dynamically, without shutting down any of the servers. In one embodiment, particular configuration information is selectively loaded onto certain servers, and an activation step is recognized only by those servers which have received that information. This allows the CTN split to take place dynamically within a matter of seconds without requiring the customer to shut down any of the servers. This represents a significant savings both in time and effort by the customer in addition to not requiring the temporary loss of any machines.

Figure 1:
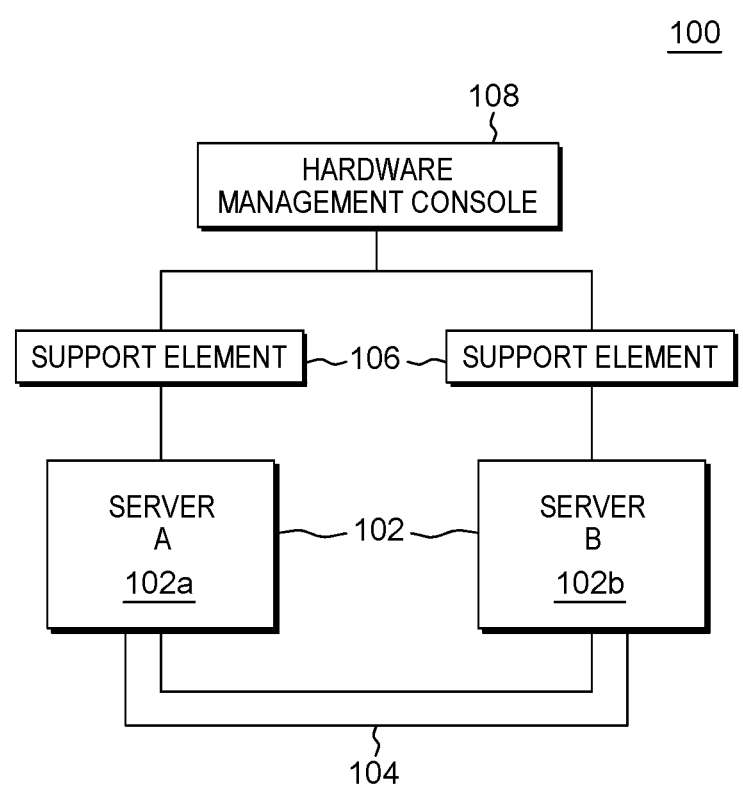
FIG. 1 depicts one example of a coordinated timing network.

One embodiment of a coordinated timing network is described with reference to FIG. 1. In this example, a coordinated timing network 100 includes a plurality of servers 102 coupled to one another via one or more STP links 104. For example, the plurality of servers 102 includes Server A 102a and Server B 102b. Although in this example, two servers are depicted, coordinated timing network 100 may include additional servers. Each server is coupled to a support element 106, which is further coupled to a hardware management console 108. The hardware management console may be the same console or a different console for each support element.

As examples, each server is a central electronics complex based on the z/Architecture offered by International Business Machines Corporation (IBM); the hardware management console is, for instance, a personal computer, such as an Intel-based personal computer with a DVD-RAM (digital video disk-random access memory), as a particular example, or other type of computer or processing device that includes functionality to provide a standard interface for configuring and operating partitioned and SMP (Symmetric Multiprocessing) systems, such as System z offered by International Business Machines Corporation; and each support element is, for instance, a workstation coupled to the central processing complex used for monitoring and operating a system. Example hardware management consoles and support elements are based on technology offered by International Business Machines Corporation. z/Architecture is a registered trademark of International Business Machines Corporation, Armonk, N.Y., USA. One embodiment of the z/Architecture is described in "z/Architecture Principles of Operation," IBM Publication No. SA22-7832-10, March 2015, which is hereby incorporated herein by reference in its entirety.

Figure 2:
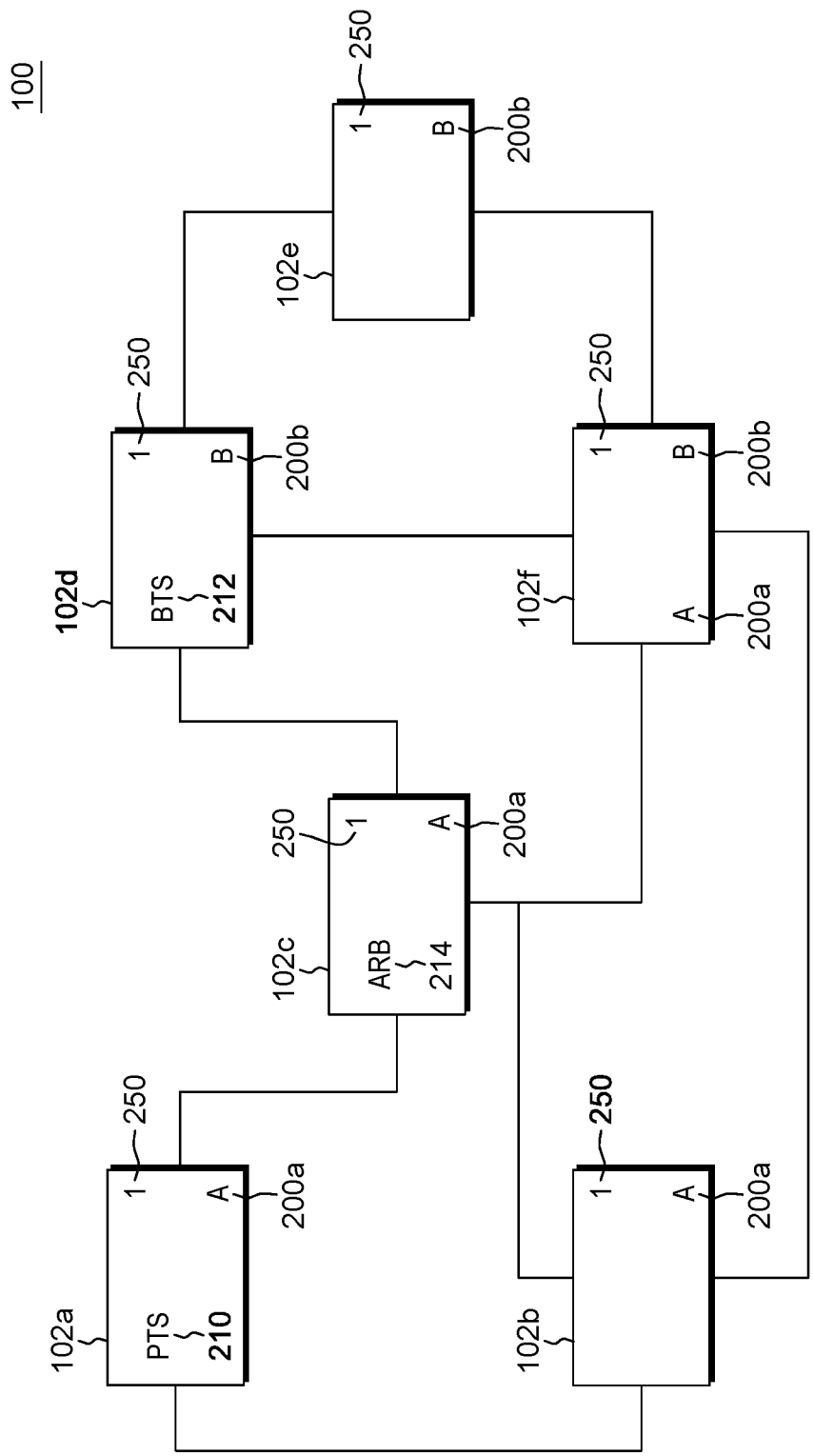
FIG. 2 depicts further details of a coordinated timing network, in accordance with an aspect of the present invention.

Further details regarding coordinated timing network 100 are described with reference to FIG. 2. In this example, coordinated timing network 100 includes a plurality of servers 102 (e.g., servers 102a-102f), and each server 102 includes one or more partitions 200 (e.g., logical partitions). Each partition is part of a particular Sysplex (system complex of servers), and the Sysplex of a particular partition is indicated by the letter A or B, in this example. Thus, partitions 200a are part of Sysplex A, and partitions 200b are part of Sysplex B.

Further, in one example, one of the servers, server 102a, is a primary time server (PTS) 210 providing current time for coordinated timing network 100. Further, server 102d is a backup time server (BTS) 212 for coordinated timing network 100. Yet further, another server 102c is an arbiter (ARB) 214 for coordinated timing network 100. The arbiter server facilitates determination of a failure of the primary time server. As shown in FIG. 2, each server is part of a single coordinated timing network as indicated by a CTN ID 250 (e.g., CTN ID 1) in each server 102.

Although certain servers are indicated as providing the timing roles of primary time server, backup time server and arbiter, in one embodiment, these roles are provided by the servers in conjunction with their support elements.

Servers in a CTN that are in the synchronized state are assigned a value, referred to as a stratum level, that specifies the number of servers between it and a primary time server. A primary time server operates at a stratum level of 1; secondary time servers operate at a stratum level of 2 or above, which increases as the number of servers in the timing path to the stratum-1 increases. In general, the quality of timekeeping information decreases as the stratum level increases. A server that is unsynchronized is assigned a stratum level of 0.

Figure 3:
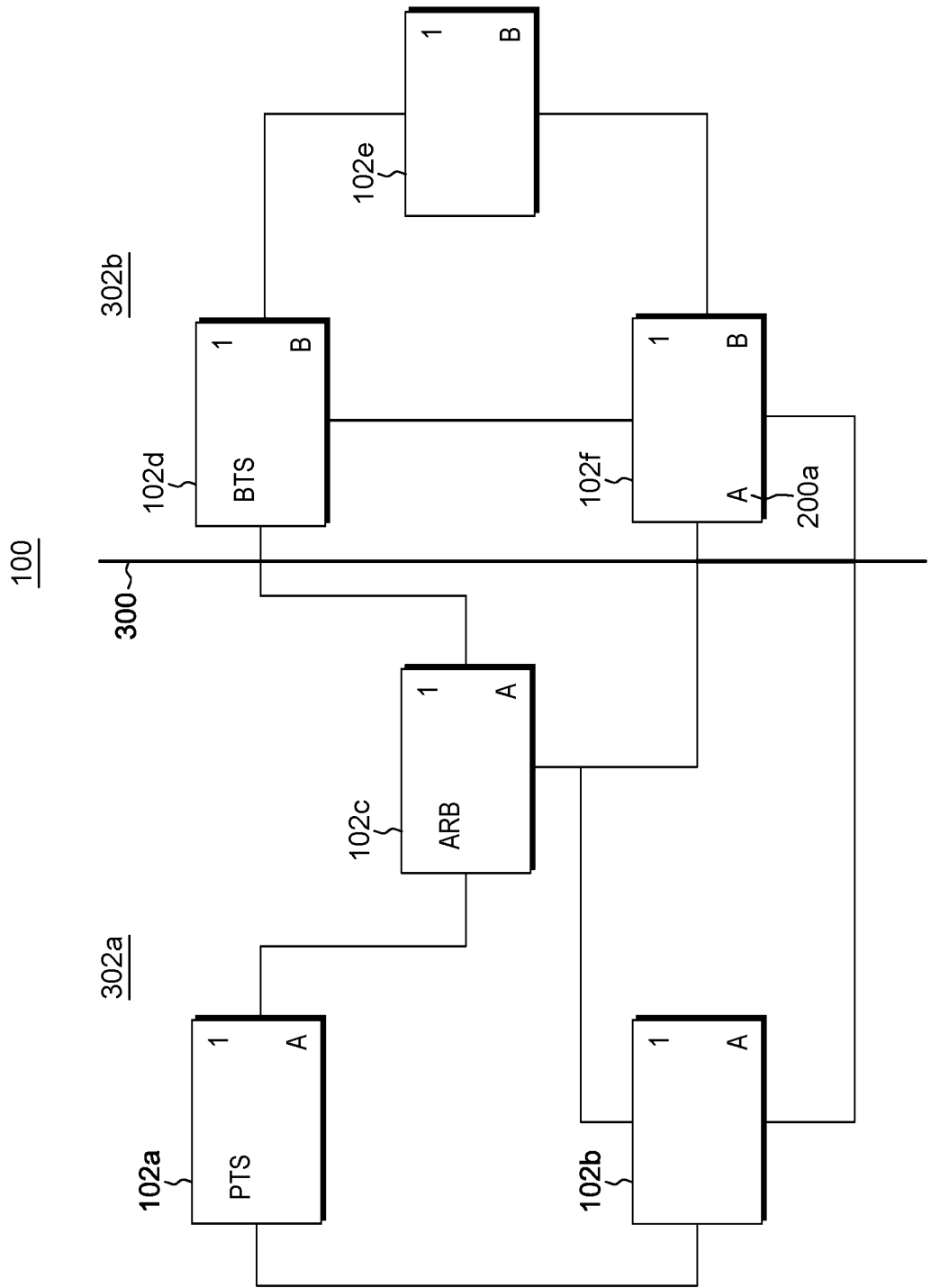
FIG. 3 depicts one embodiment of an indication of splitting a coordinated timing network into a plurality of coordinated timing networks, in accordance with an aspect of the present invention.

In one example, a customer would like to split the CTN into multiple coordinated timing networks. For instance, CTN 100 is to be split into two coordinated timing networks, as indicated in FIG. 3 at 300. In this example, servers 102a-102c are to be a part of a first coordinated timing network 302a, also referred to herein as the "old" coordinated timing network; and servers 102d-102f are to be a part of a second coordinated timing network 302b, referred to herein as a "new" coordinated timing network. In one example, if a coordinated timing network is to be split, then all partitions of one Sysplex are to be a part of the same coordinated timing network. For instance, in the particular example of FIG. 3, the partitions of Sysplex A are to be a part of coordinated timing network 302a, and the partitions of Sysplex B are to be a part of coordinated timing network 302b. Thus, the partition of Sysplex A (200a) located in server 102f is to be moved to one of servers 102a-102c, as described further below.

One embodiment of logic used to split a coordinated timing network into multiple timing networks is described with reference to FIG. 4. In one example, one or more processors of one or more support elements and/or one or more servers are used to perform aspects of the logic to split the coordinated timing network.

Figure 4:
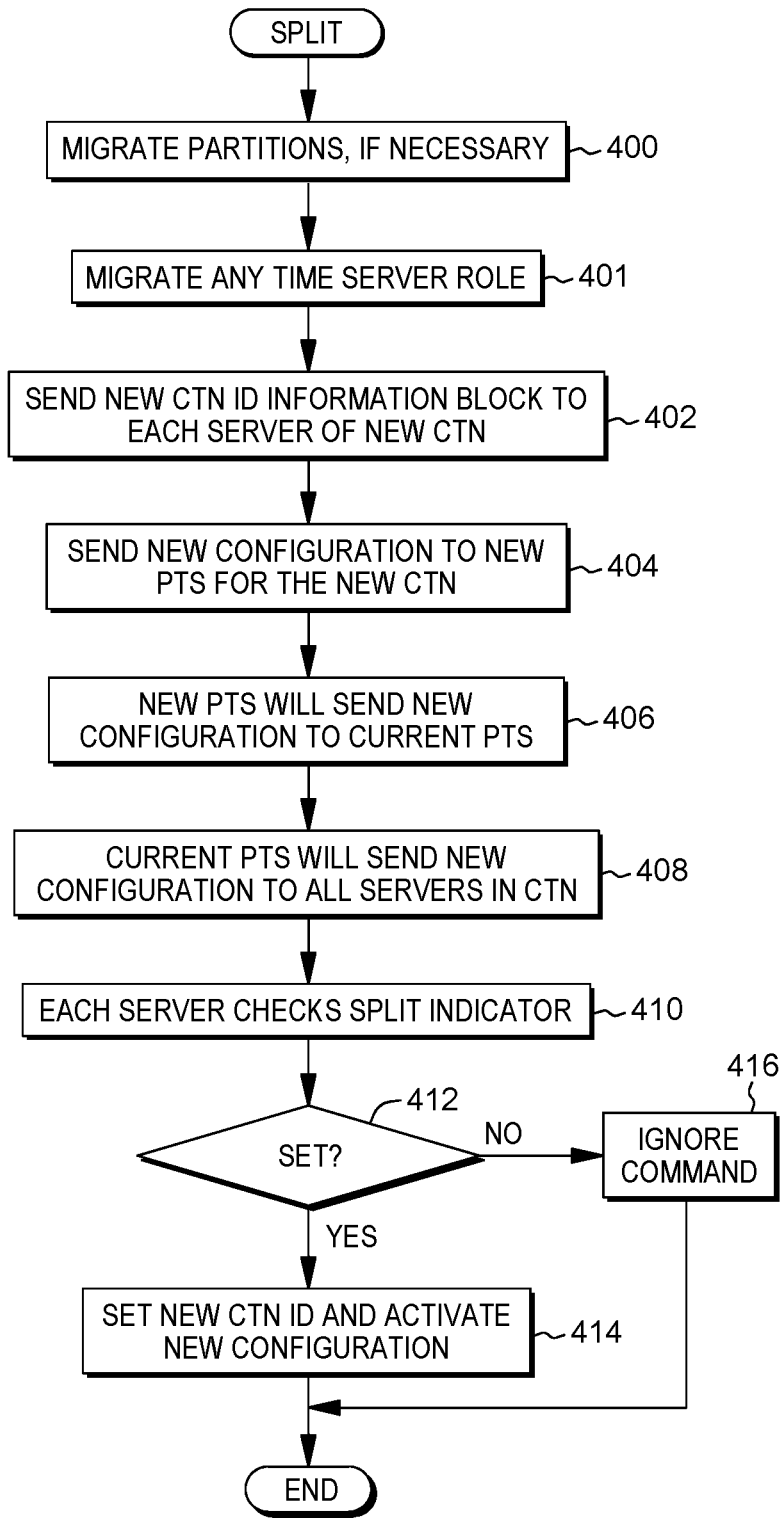
FIG. 4 depicts one embodiment of logic to split a coordinated timing network into a plurality of coordinated timing networks, in accordance with an aspect of the present invention.
Figure 7:
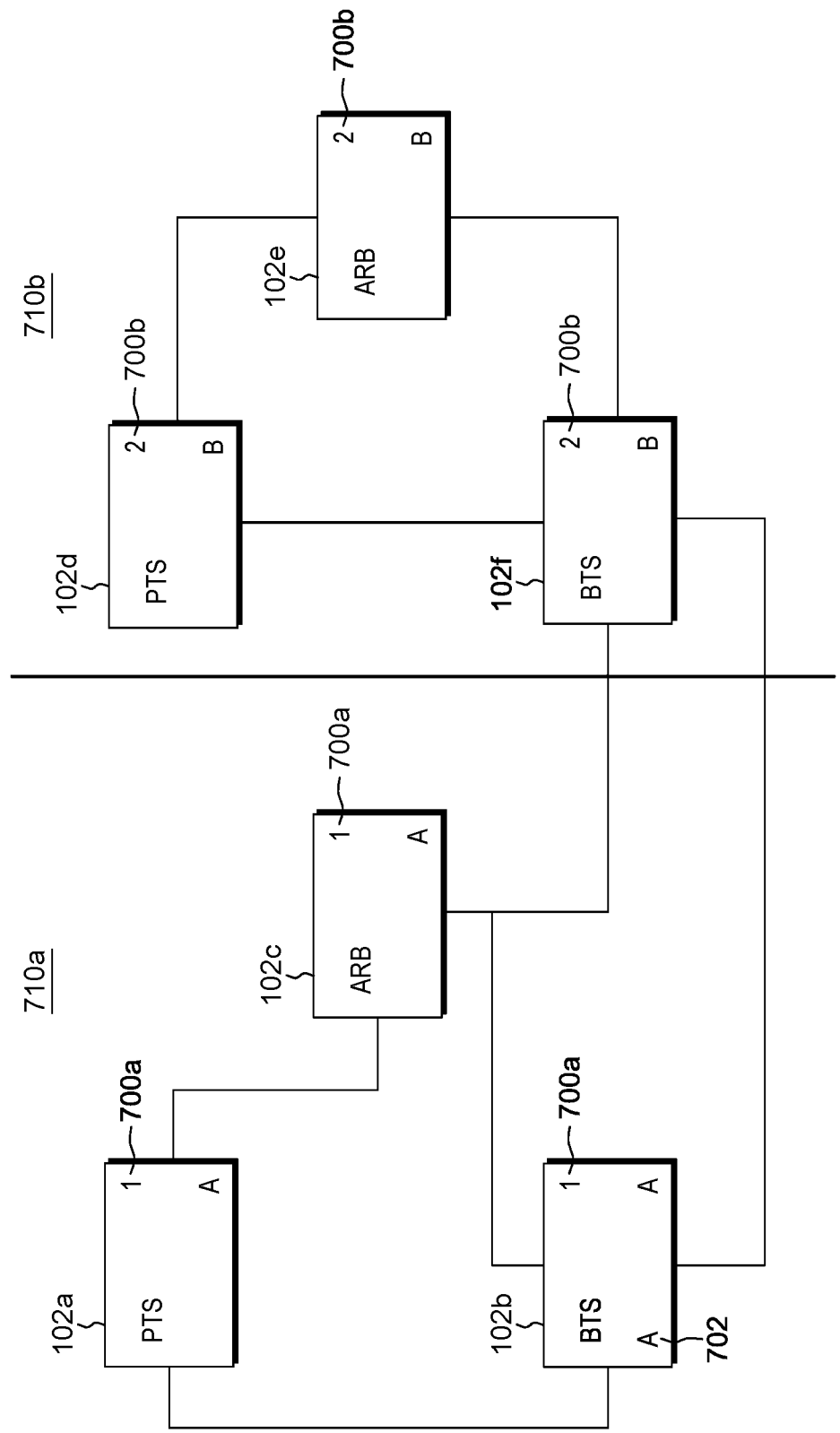
FIG. 7 shows a result of splitting a coordinated timing network into a plurality of coordinated timing networks, in accordance with an aspect of the present invention.

Referring to FIG. 4, initially, any partitions of a sysplex to be a part of the old CTN that are currently in a server that is to be included in the new CTN (e.g., partition 200a of server 102f) are migrated to a server of the old CTN, STEP 400. For instance, partition 200a of server 102f is to be moved to any of servers 102a-102c. In this particular example, it is moved to server 102b, as shown in FIG. 7 at reference 702, discussed further below. This includes, for instance, an operator action to shift the configuration to move the image of the sysplex.

Further, if any server that is to be included in the new CTN has a timing role, such as a primary time server, a backup time server or an arbiter, then that role is migrated to a server in the old CTN, STEP 401. For instance, the backup time server role is currently in a server that is to be included in the new CTN, thus, the role of the backup time server is migrated from its current server (e.g., server 102d) to one of the servers to be included in the old CTN (e.g., server 102b). This includes, for instance, selecting by the operator, via, e.g., an STP control panel on the support element coupled to the primary time server, a new server (e.g., server 102b) to take on the role of the backup time server. This selection results in a command, such as a modify stratum-1 configuration command, to be sent from the support element (or in another example, from a server, such as server 102a) to the servers of the CTN that indicates the change in the timing roles. The modify stratum-1 configuration command includes in its request block a new stratum-1 configuration information block or at least an indication of the block that provides the configuration information, including the new timing roles, as described below.

Additionally, a new CTN ID information block is sent to each server that is to be included in the new coordinated timing network, STEP 402. This block provides an identifier of the new coordinated timing network to the servers that are to belong to that CTN. It also provides a set split indicator that indicates that a split is to be performed, and thus, activation of the new CTN ID is not to be performed immediately, but instead, after receipt of a modify stratum-1 configuration command to be sent shortly. In particular, in one example, a modify CTN ID command is issued by the operator at a support element of each server to be included in the new CTN (e.g., servers 102*d*-102*f*) and each support element then provides the command to its corresponding server. The command includes in its request block the new CTN ID information block or at least an indication of the block, and that block provides particular information to the servers of the new CTN.

Figure 5:
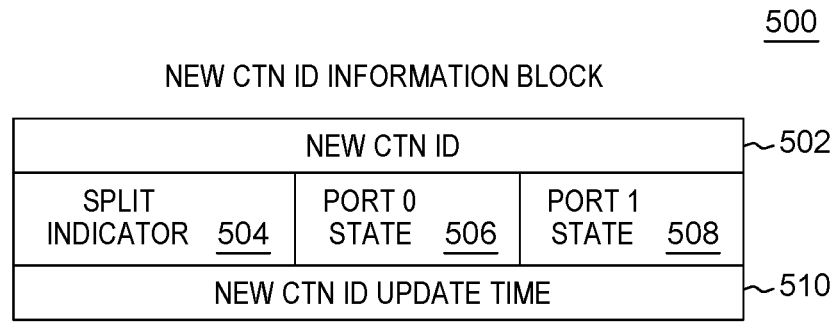
FIG. 5 depicts one example of a new CTN ID information block used in accordance with an aspect of the present invention.

One example of a new CTN ID information block is described with reference to FIG. 5. As one example, a new CTN ID information block 500 includes, for instance, a new CTN ID 502 identifying the new CTN; a split indicator 504 (e.g., a bit), which when one, indicates that the server will become a member of the new CTN—this data will not be acted upon until a stratum-1 configuration is activated that has a matching CTN ID, as described below; an ETR (external time reference) Port 0 Manual Port State (port 0 state) 506 that includes a manual port state code that specifies the intended state of ETR port 0, when the new CTN ID field specifies a non-null ETR network number; an ETR Port 1 Manual Port State (port 1 state) 508 that includes a manual port state code that specifies the intended state of ETR port 1, when the new CTN ID field specifies a non-null ETR network number; and a new CTN update time 510 providing a time in which the new CTN is to become current (Note: This field is ignored when split indicator 504 is set). Although various fields are described herein, more, less and/or different fields may be included in the new CTN ID information block without departing from a spirit of one or more aspects of the present invention.

Returning to FIG. 4, in addition to sending the new CTN ID information block, a new configuration (e.g., a new stratum-1 configuration) is sent to the server designated to be the new primary time server for the new coordinated timing network (e.g., server 102*d*), STEP 404. In one example, a modify stratum-1 configuration command is issued at the support element coupled to the server designated to be the new primary time server, and that support element provides the command to that server. A request block of the command includes, for instance, a new stratum-1 configuration information block or at least an indication of the block, and that block includes configuration information.

Figure 6:
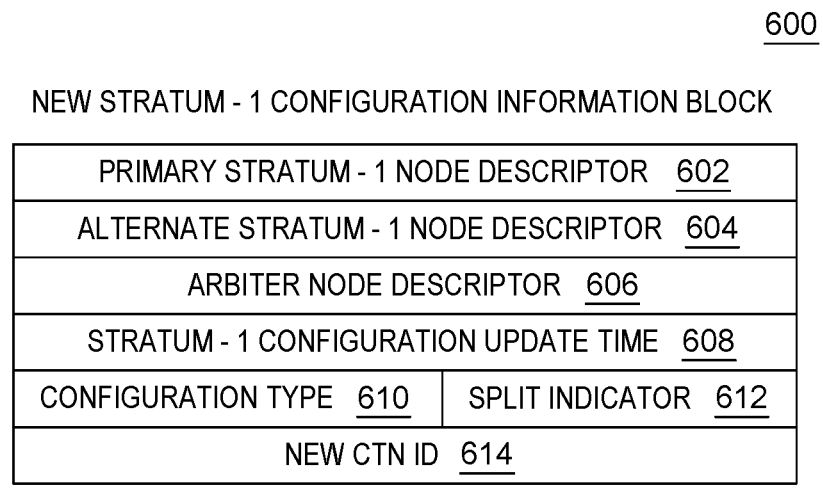
FIG. 6 depicts one example of a new stratum-1 configuration information block used in accordance with an aspect of the present invention.

One embodiment of a new stratum-1 configuration information block is described with reference to FIG. 6. In one example, a new stratum-1 configuration information block 600 includes a plurality of fields that include information, such as, for instance:

A primary stratum-1 node descriptor 602: This field is valid when a single server, dual server or triad definition has been specified in the configuration type field (discussed below) and includes the node descriptor of the new primary stratum-1 node;

An alternate stratum-1 node descriptor 604: This field is valid when a dual server or triad definition has been specified in the configuration type field and includes the node descriptor of the new alternate stratum-1 node (i.e., the backup time server);

An optional arbiter node descriptor 606: This field is valid when a triad definition has been specified in the configuration type field and includes the node descriptor of the new arbiter node;

A stratum-1 configuration update time 608: This field includes a timestamp that indicates when the values in this block are to become current for the CTN;

A configuration type 610: This field specifies the type of stratum-1 configuration, as defined below:

Null definition—None of the node descriptors are valid.

Single server definition—Only the primary stratum-1 node descriptor is valid. In a single server configuration, if the primary time server is lost, synchronized time for the CTN is lost, since there is no backup.

Dual server definition—The primary stratum-1 and alternate stratum-1 (backup time server) node descriptors are valid. In a dual server configuration, a mechanism is provided for an alternate server to be able to take over the role of an active stratum-1 server for the CTN.

Triad definition—The primary stratum-1, alternate stratum-1 and arbiter node descriptors are valid. In a triad configuration, a primary time server, a backup time server and an arbiter are provided. The arbiter server may be used to determine a failure of the primary time server.

A split indicator 612: When the split indicator (e.g., a bit) is set to one, it indicates that this is a special configuration that will be used to split the CTN into multiple coordinated timing networks. When this configuration is activated, if a server has a matching new CTN ID with its own split bit set, it will activate the new CTN ID as well as the stratum-1 configuration. If a server does not have a matching new CTN ID or if the split bit is not set, it will not activate this configuration, simply throwing the configuration away, and clearing out both the new CTN ID and new stratum-1 configuration blocks; and A new CTN ID 614: This field specifies a new CTN identifier identifying the new CTN.

Although various fields are described herein, more, less and/or different fields may be included in the new stratum-1 configuration information block without departing from a spirit of one or more aspects of the present invention.

Returning to FIG. 4, the new primary time server (e.g., the support element and/or server) sends the new stratum-1 configuration to the current primary time server, STEP 406. The current primary time server (e.g., the support element and/or server) then sends the new stratum-1 configuration to all servers in the coordinated timing network, STEP 408. In one example, the new configuration is sent via the modify stratum-1 configuration command. This command includes the new stratum-1 configuration information block or an indication of the configuration block in a request block of the command. This request block may further indicate this is a requested split reconfiguration.

Each server, based on receiving the new stratum-1 configuration and the requested split reconfiguration, checks its local split indicator to see if the server is to be a part of the new coordinated timing network, STEP 410. That is, each server checks its configuration area to determine whether it received a new CTN ID information block with a set split indicator 504 (e.g., set to 1). If its indicator is set, INQUIRY 412, then the new CTN ID is set and the new configuration is activated at that server, STEP 414. In one example, this includes indicating the new stratum-1 configuration is to be recognized, based on reaching the stratum-1 configuration update time. Additionally, all of the STP connections for the servers in the new CTN are restarted (e.g., by sending new connection requests). The servers remaining in the old CTN will not connect because the CTN IDs do not match.

Therefore, STP connections after the split may only exist between servers which are part of the same CTN.

Returning to INQUIRY 412, if the split indicator is not set for a particular server, then the command is ignored by that server, STEP 416. This allows the coordinated timing network to be split non-disruptively in that none of the servers need to be taken off-line. That is, each server may continue processing its workload.

A resulting split coordinated timing network is depicted in FIG. 7. As shown, servers 102a-102c are in one coordinated timing network 710a having a coordinated timing network ID of 1 (700a); and servers 102d-102f are in the new coordinated timing network 710b as identified by a CNT ID of 2 (700b). Each coordinated timing network in this example has a primary time server (PTS), a backup time server (BTS) and an arbiter (ARB).

In one further embodiment, the coupling links between the two CTNs may be removed as well.

Described in detail herein is a CTN splitting capability that changes the CTN ID for one or more servers of a CTN and concurrently changes which server is to be the source of time for the CTN without shutting down any of the servers. Although it is indicated herein that servers perform or are involved in certain actions, these actions may be performed by the servers, the support elements coupled to the servers and/or by a combination of the servers and the support elements. Thus, the term "component of a server" used herein may include the server, the support element and/or the server with the support element.

As described herein, in one or more aspects, a configuration change is loaded onto each of the servers which will become a part of the new coordinated timing network (via, e.g., standard STP operating commands). This new configurations includes a special flag (e.g., the split indicator) to indicate this is part of a split CTN change, a new CTN ID, as well as the definition of the source of time roles for the new CTN. These changes remain dormant until specifically activated. Once all of the new configurations have been loaded and the customer is ready to make the change, an STP operating command, such as a modify stratum-1 configuration command, is sent throughout the entire current unsplit CTN with a flag indicating this is a split CTN situation. Upon receipt of this command, each server checks its configuration area to see if the split indicator has been set locally (via a new configuration). If it is set, then the new configuration is activated; otherwise, the command is ignored. As with any configuration change for STP, the STP connections are restarted to ensure that the configurations match. In the split situation, the STP connections after the split only remain between servers which are part of the same CTN, so the CTN will have been effectively split.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 8:
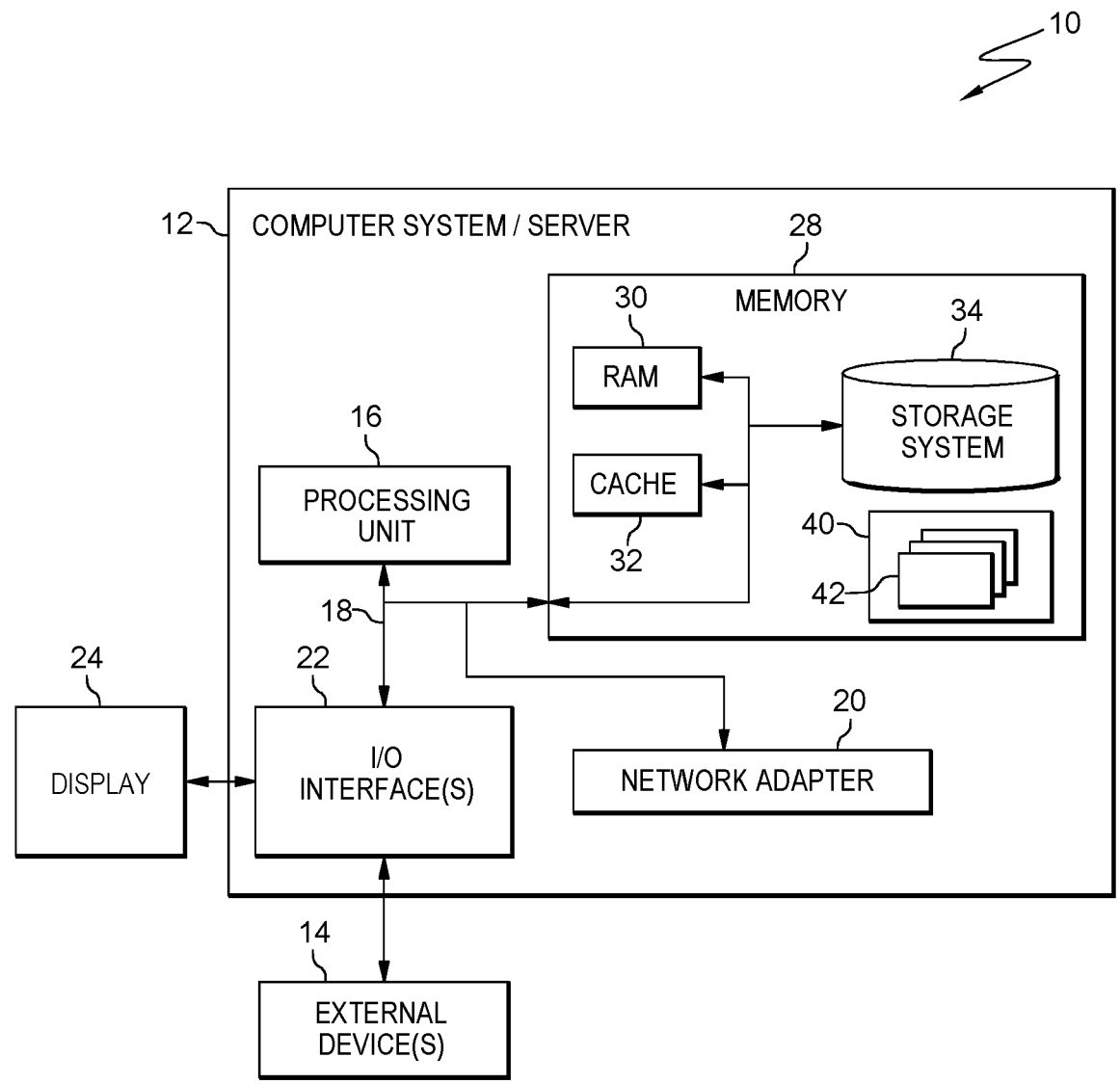
FIG. 8 depicts one embodiment of a cloud computing node.

Referring now to FIG. 8, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 9:
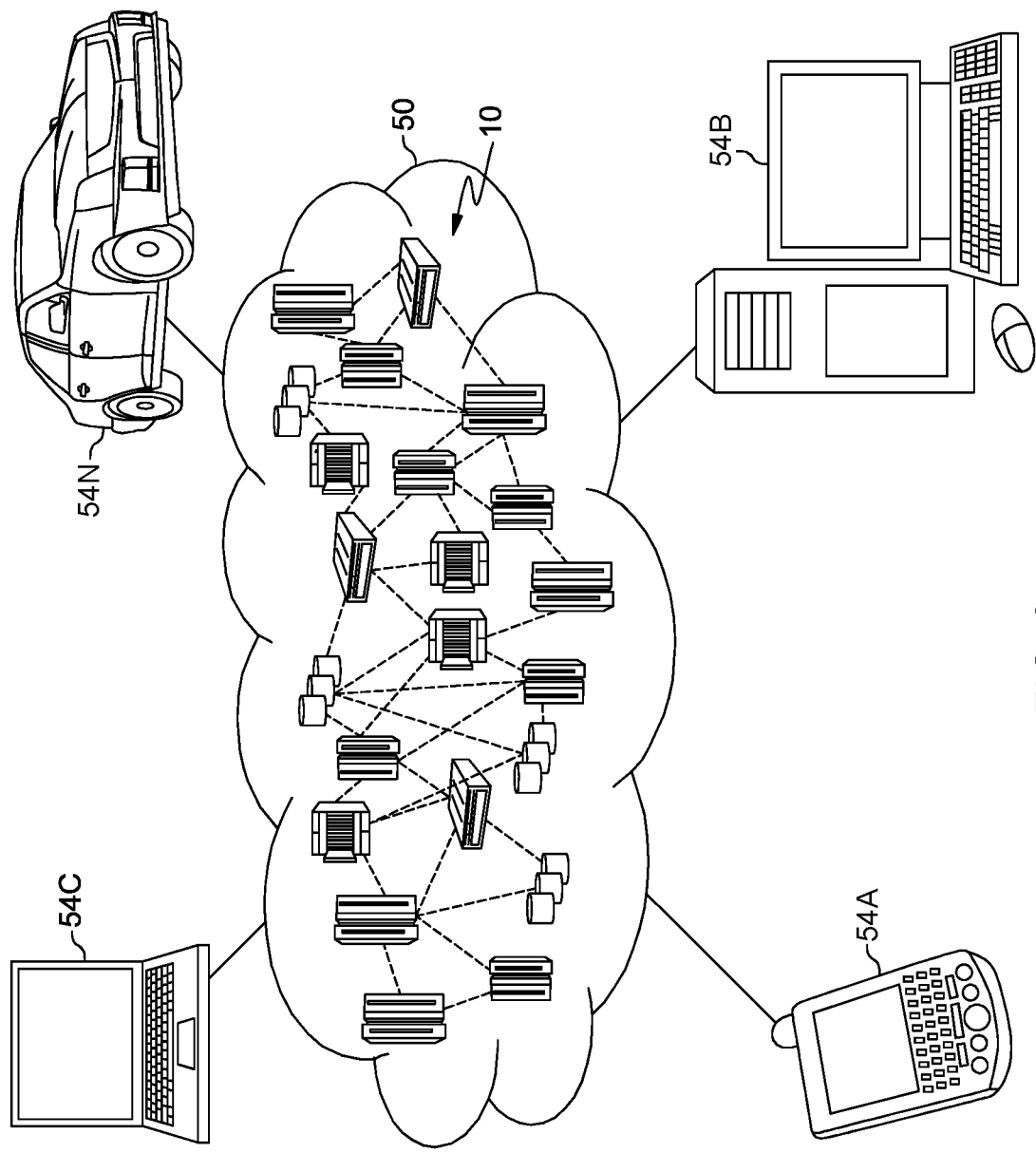
FIG. 9 depicts one embodiment of a cloud computing environment.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
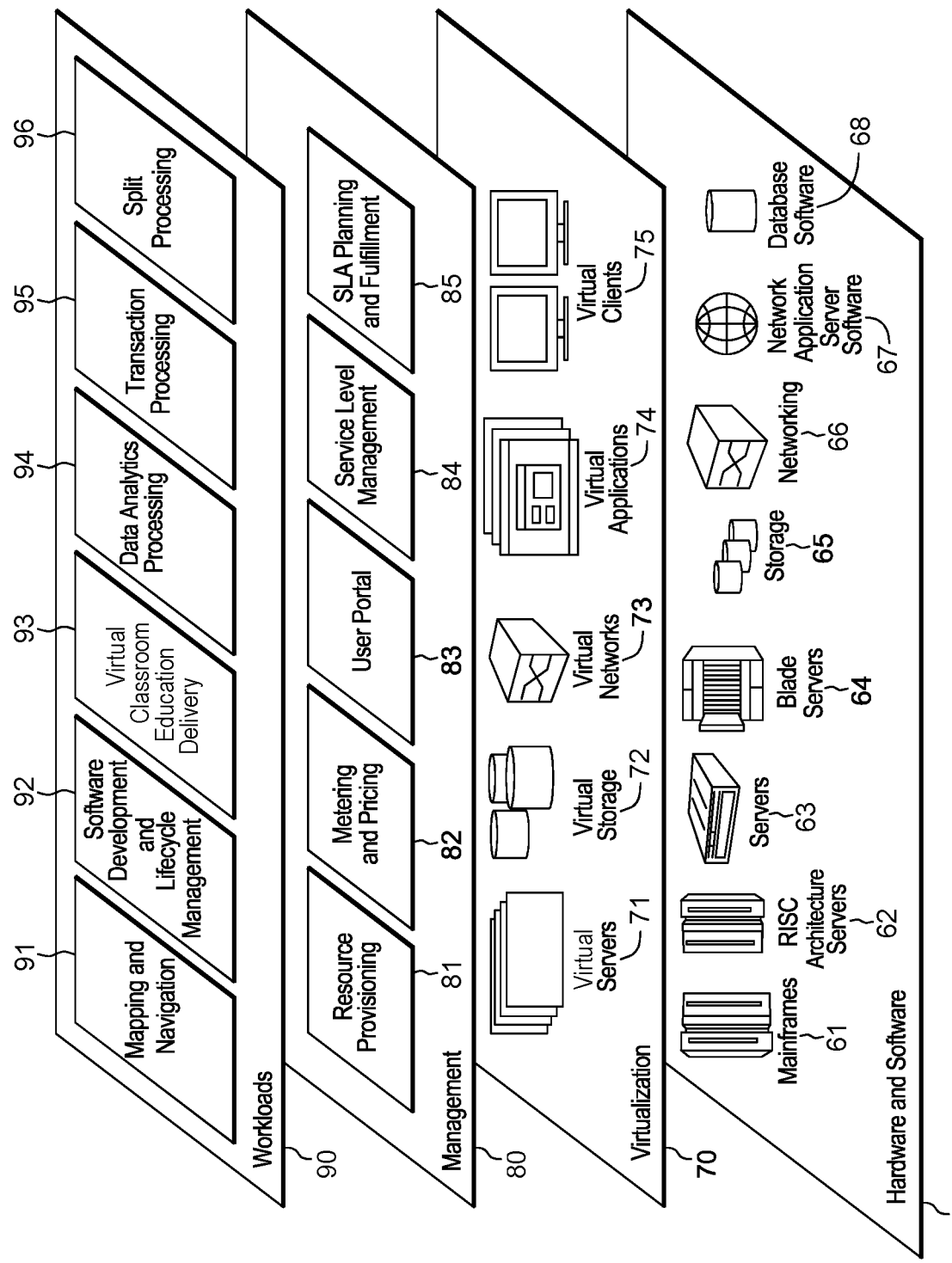
FIG. 10 depicts one example of abstraction model layers.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and split processing 96.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for managing coordinated timing networks, the computer program product comprising:
a non-transitory computer readable storage medium readable by a processing circuit and storing instructions for performing a method comprising:
determining that a coordinated timing network (CTN) is to be split into a plurality of coordinated timing networks, the coordinated timing network including a plurality of servers, and wherein the plurality of coordinated timing networks comprises one coordinated timing network and another coordinated timing network, and wherein the one coordinated timing network comprises one set of servers of the plurality of servers and the other coordinated timing network comprises another set of servers of the plurality of servers; and
based on determining that the coordinated timing network is to be split, splitting the coordinated timing network into the plurality of coordinated timing networks, wherein the splitting is performed non-disruptively in that servers of the coordinated timing network continue processing during the splitting, and wherein the splitting comprises:
providing a new CTN identifier to the other set of servers to be included in the other coordinated timing network; and
providing a new configuration to the plurality of servers in the coordinated timing network, the new configuration employed to indicate which servers of the CTN are to be a part of the one set of servers and which servers of the CTN are to be a part of the other set of servers, and wherein the providing the new configuration comprises:
providing the new configuration to a server of the other set of servers designated to be a primary time server of the other coordinated timing network; and
providing, by the primary time server of the other coordinated timing network, the new configuration to a primary time server of the one coordinated timing network, the primary time server of the one coordinated timing network to provide the new configuration to the plurality of servers in the coordinated timing network.

2. The computer program product of claim 1, wherein the providing the new CTN identifier further includes providing a split indicator set to indicate that the other set of servers is to be included in the other coordinated timing network.

3. The computer program product of claim 2, wherein the providing the new CTN identifier comprises providing a new CTN identifier information block, the new CTN identifier information block comprising the new CTN identifier and the split indicator.

4. The computer program product of claim 1, wherein the method further comprises:
receiving by a component of a server of the other set of servers the new configuration;
checking by the component of the server of the other set of servers a split indicator; and
based on determining the split indicator is set, activating the new configuration by the component of the server of the other set of servers.

5. The computer program product of claim 1, wherein the providing the new configuration comprises providing a new configuration block that includes the new configuration.

6. The computer program product of claim 1, wherein the new configuration includes an indication of which server of the other set of servers is to be the primary time server of the other coordinated timing network.

7. The computer program product of claim 6, wherein the new configuration further includes another indication of which other server of the other set of servers is to be a backup time server.

8. A computer system for managing coordinated timing networks, the computer system comprising:
 a memory; and
 a processor in communication with the memory, wherein the computer system is configured to perform a method, said method comprising:
  determining that a coordinated timing network (CTN) is to be split into a plurality of coordinated timing networks, the coordinated timing network including a plurality of servers, and wherein the plurality of coordinated timing networks comprises one coordinated timing network and another coordinated timing network, and wherein the one coordinated timing network comprises one set of servers of the plurality of servers and the other coordinated timing network comprises another set of servers of the plurality of servers; and
  based on determining that the coordinated timing network is to be split, splitting the coordinated timing network into the plurality of coordinated timing networks, wherein the splitting is performed non-disruptively in that servers of the coordinated timing network continue processing during the splitting, and wherein the splitting comprises:
   providing a new CTN identifier to the other set of servers to be included in the other coordinated timing network; and
   providing a new configuration to the plurality of servers in the coordinated timing network, the new configuration employed to indicate which servers of the CTN are to be a part of the one set of servers and which servers of the CTN are to be a part of the other set of servers, and wherein the providing the new configuration comprises:
    providing the new configuration to a server of the other set of servers designated to be a primary time server of the other coordinated timing network; and
    providing, by the primary time server of the other coordinated timing network, the new configuration to a primary time server of the one coordinated timing network, the primary time server of the one coordinated timing network to provide the new configuration to the plurality of servers in the coordinated timing network.

9. The computer system of claim 8, wherein the method further comprises:
 receiving by a component of a server of the other set of servers the new configuration;
 checking by the component of the server of the other set of servers a split indicator; and
 based on determining the split indicator is set, activating the new configuration by the component of the server of the other set of servers.

10. The computer system of claim 8, wherein the providing the new CTN identifier further includes providing a split indicator set to indicate that the other set of servers is to be included in the other coordinated timing network.

11. The computer system of claim 10, wherein the providing the new CTN identifier comprises providing a new CTN identifier information block, the new CTN identifier information block comprising the new CTN identifier and the split indicator.

12. The computer system of claim 8, wherein the providing the new configuration comprises providing a new configuration block that includes the new configuration.

13. The computer system of claim 8, wherein the new configuration includes an indication of which server of the other set of servers is to be the primary time server of the other coordinated timing network.

14. The computer system of claim 13 wherein the new configuration further includes another indication of which other server of the other set of servers is to be a backup time server.

15. A computer-implemented method of managing coordinated timing networks, the computer-implemented method comprising:
 determining that a coordinated timing network (CTN) is to be split into a plurality of coordinated timing networks, the coordinated timing network including a plurality of servers, and wherein the plurality of coordinated timing networks comprises one coordinated timing network and another coordinated timing network, and wherein the one coordinated timing network comprises one set of servers of the plurality of servers and the other coordinated timing network comprises another set of servers of the plurality of servers; and
 based on determining that the coordinated timing network is to be split, splitting the coordinated timing network into the plurality of coordinated timing networks, wherein the splitting is performed non-disruptively in that servers of the coordinated timing network continue processing during the splitting, and wherein the splitting comprises:
  providing a new CTN identifier to the other set of servers to be included in the other coordinated timing network; and
  providing a new configuration to the plurality of servers in the coordinated timing network, the new configuration employed to indicate which servers of the CTN are to be a part of the one set of servers and which servers of the CTN are to be a part of the other set of servers, and wherein the providing the new configuration comprises:
   providing the new configuration to a server of the other set of servers designated to be a primary time server of the other coordinated timing network; and
   providing, by the primary time server of the other coordinated timing network, the new configuration to a primary time server of the one coordinated timing network, the primary time server of the one coordinated timing network to provide the new configuration to the plurality of servers in the coordinated timing network.

16. The computer-implemented method of claim 15, further comprising:
 receiving by a component of a server of the other set of servers the new configuration;
 checking by the component of the server of the other set of servers a split indicator; and
 based on determining the split indicator is set, activating the new configuration by the component of the server of the other set of servers.

17. The computer-implemented method of claim 15, wherein the providing the new CTN identifier further includes providing a split indicator set to indicate that the other set of servers is to be included in the other coordinated timing network.

18. The computer-implemented method of claim 17, wherein the providing the new CTN identifier comprises providing a new CTN identifier information block, the new CTN identifier information block comprising the new CTN identifier and the split indicator.

19. The computer-implemented method of claim 15, wherein the providing the new configuration comprises providing a new configuration block that includes the new configuration.

20. The computer-implemented method of claim 15, wherein the new configuration includes an indication of which server of the other set of servers is to be the primary time server of the other coordinated timing network.

* * * * *